3,352,618
PERISCOPE FOR USE IN SUBMARINES
Abraham C. S. Van Heel, Delft, Gerardus J. Beernink, The Hague, and Hendrik J. Raterink, Delft, Netherlands, assignors to The Kingdom of the Netherlands represented by the Underminister of Defence
Filed Nov. 3, 1960, Ser. No. 67,136
Claims priority, application Netherlands, Dec. 22, 1954, 193,440
1 Claim. (Cl. 350—16)

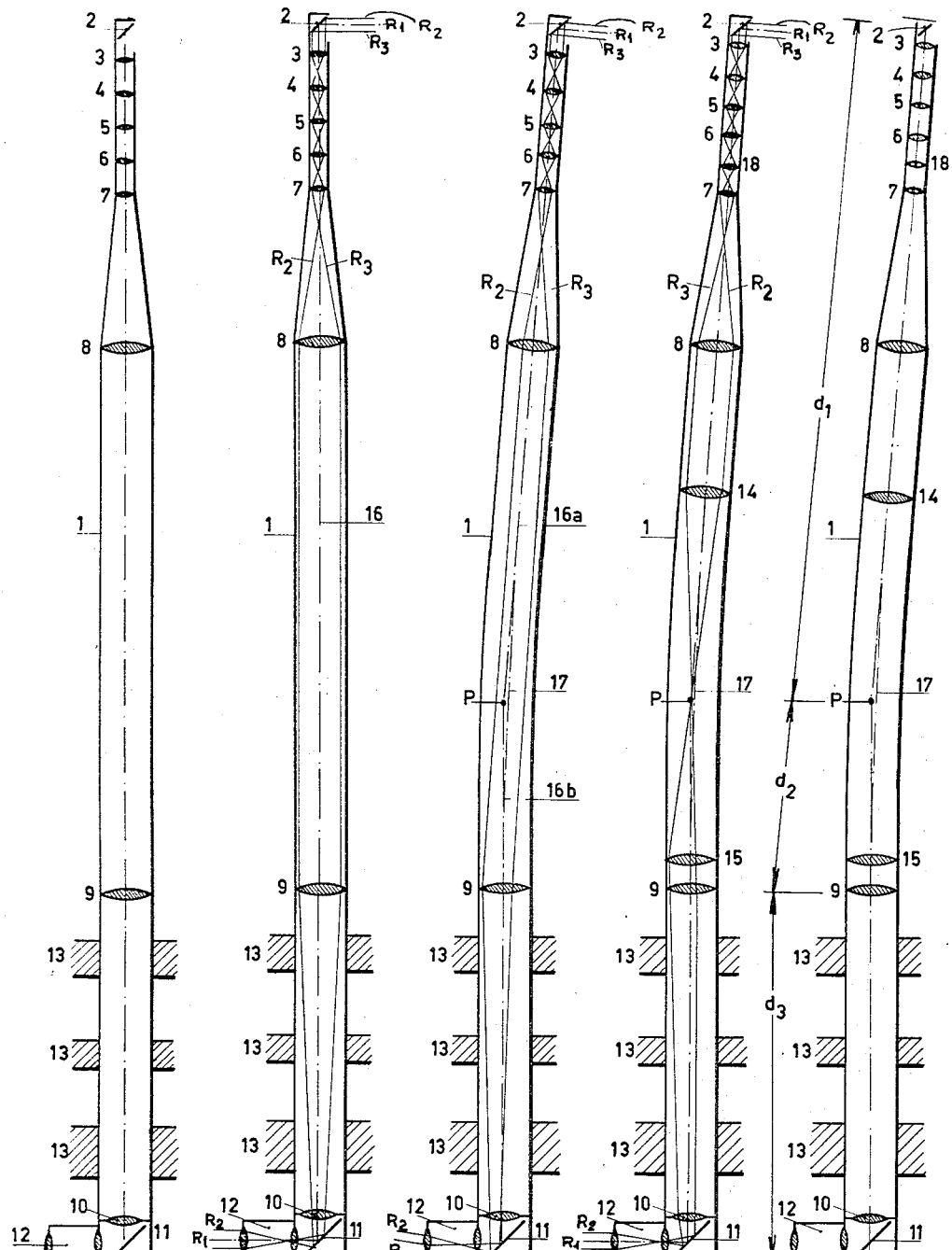

This application is a continuation-in-part of United States patent application Ser. No. 554,052, filed Dec. 19, 1955, and now abandoned.

Our invention relates to periscope for use in submarines and its main object is a periscope which can be used when the submarine is moving under water at high speed.

It is a well known fact that the periscope of a moving submarine is subject to vibrations which are partly due to the circumstance that the motion of the periscope produces whirls and on the other hand to the water waves due to other causes than the moving submarine.

Said vibrations of the periscope produce vibrations of the observed image and observations are impossible when the speed of the submarine is not very low.

An object of our invention is an optical system for a periscope in which the vibrations of the image due to the vibration of parts of the periscope optics are not transmitted to the eye piece.

In a periscope the light rays impinging upon the mirror or similar observing instrument in the top of the periscope are reflected and directed on an optical system, comprising a number of lenses fixed in different places of the periscope tube. When the periscope is at rest the optical axis of the system coincides with a straight line in the periscope. When however the periscope vibrates, the tube and also its axis is bent over a large part of its length.

This bending of the periscope produces a displacement of the image and when the periscope vibrates, the image oscillates, thereby preventing the observation of any target.

This oscillating movement of the image can be described as a motion of the optical axis of the optical system of the periscope.

We have discovered that the motion of the optical axis of the system can be represented with a surprisingly good approximation as the motion of two straight lines pivoting about a fixed point located at an intermediate point between the top and the base of the periscope.

These straight lines are the tangents to the optical axes of the system in the top of the periscope and the optical system near the base of the periscope.

According to our invention the optical system is so designed that an intermediate image is formed in a plane containing said point.

Our invention will best be understood by reference to the following specification taken in connection with the accompanying drawings in which:

FIG. 1 is a diagram of the optical system of a conventional periscope in the state of rest.

FIG. 2 is a diagram of the path followed by the light rays.

FIG. 3 is a diagram of the path followed by the light rays when the periscope is bent, and shows where the intersection point of the optical axes of the upper and lower parts is located.

FIG. 4 shows the path of the light rays in the periscope shown in FIG. 5.

FIG. 5 shows the arrangement of the optical system in a periscope.

In FIG. 1, the periscope tube has the reference number 1. 2 is a prism, serving as a mirror to deflect the incoming rays into the periscope tube.

In the thin upper part lenses 3, 4, 5, 6 and 7 are fixed and in the other part a system of lenses 8, 9, 10 is found together with a prism 11 that deflects the rays in a horizontal direction into the eye piece generally indicated by 12.

The lower part of the periscope tube is clamped at 13.

In FIG. 2 the paths of three rays $R_1$, $R_2$, $R_3$ are shown.

FIG. 3 shows how the path of rays $R_2$ and $R_3$ are modified when the periscope tube is in the bent state. Due to the fact that the system of lenses 3–8 (inclusive) is tilted the parallel beam formed by the lens 8 is no longer perpendicular to the horizontal lens and the rays $R_2$ and $R_3$ emerging from the eye piece are not horizontal as in FIGURE 1. When the periscope is vibrating the direction of the rays $R_2$ and $R_3$ will change continuously and observation is impossible even if the amplitude of the top of the periscope is only small.

In FIG. 3 P is the intersection point of the optical axes 16a and 16b of the upper and lower parts of the periscope.

Due to the bending of the periscope tube the centerline 17 of the periscope tube will not pass through point P which remains always in the same position. When the periscope is vibrating, the centerline will oscillate and only pass through the point P whenever the periscope momentarily assumes the position shown in FIGS. 1 and 2.

FIG. 4 shows the arrangement according to the present invention.

In this figure lenses 14 and 15 are added. Lens 14 forms a real image at P and lens 15 restores the degree of divergence or convergence of the beam emerging from the lens 8. In the figure it is assumed that the beam emerging from 8 was a parallel beam.

As the forming of an image between the lenses 14 and 15 reverses the image it is necessary to compensate this reversal by an additional reversal. This is done by adding an extra lens 18 in the top part of the periscope.

This is shown in FIGS. 4 and 5.

The path of the rays is shown in FIG. 4.

When one intends to apply the optical compensation, then first one must know the position of the intersection point P of the two practically straight parts of the periscope tube. This periscope tube can be considered as a vibrating hollow cylinder, clamped at one end, in a turbulent fluid.

There are several ways to determine the position of the intersection point P:

(A) First, the position of P could be determined in a theoretical way, since this vibration can be considered as an hydrodynamic problem, especially the study of the frequencies of the eddies, generated by the motion of a circular cylinder through a fluid.

(B) A trial run at sea can be made to fix the position of the point P, by use of strain-gauges. These gauges are attached at several points along the periscope tube, and the bending of the periscope tube can be derived by conventional methods, so that the shape of the tube in each phase of a vibration can be found.

(C) Having made an estimate for the position of the point P and having inserted an intermediate image at this point, then the position of this point P can be found very precisely by varying the clamped length of the periscope tube and by determining the maximum degree of compensation. If the optimum degree of compensation corresponds with an increased clamped length the position of P must be lowered over a distance which is about half the increase of the clamped length. This can be done by shifting the lenses 14 and 15 within the periscope tube.

It will now be described by way of example how in a particular case the position of the intersection point P was determined.

The example relates to a periscope used in the type O submarines of the Royal Netherlands Navy, especially to the submarines O–21, O–24 and O–27 (NATO submarines S–801, S–804 and S–807). On these submarines the invention has been applied successfully, but it is also applicable to other types and makes of submarine periscopes.

The tested type of attack-periscope has been manufactured by Zeizz-Nedinsco, Venlo, Netherlands.

The periscope tube was made of a special type of stainless steel, with a chemical analysis as indicated below:

|  | Percent |
|---|---|
| Carbon | < 0.1 |
| Silicon | < 1.0 |
| Manganese | < 1.0 |
| Nickel | 10.5 to 11.5 |
| Chromiun | 17 to 18 |

Titanium (not less than 5 times the carbon content)

The dimensions of the periscope are (FIG. 5) $d_1$ is fifteen feet, $d_2$ is two feet and two and a half inches, $d_3$ ten feet.

A trial run at sea was made in order to fix the position of the intersection point of the two above said optical axes by means of strain-gauges, and the results were checked by means of the two other previously mentioned ways. The results agreed very well. The intersection point proved to be situated 673 mm. above the upper end of the clamped part of the periscope tube ($d_2$).

The basic frequency proved to be 4.5 c./s. and the maximum amplitude (at the top of the periscope) amounted to about 2.738 inches for this type and make of periscope. In practice the distance of the point P from the centerline of the periscope never exceeds a small portion of the diameter of the periscope tube. In this way no optical problems are involved with respect to a vignetting of the optical image.

After having determined the position of the intersection point of the two parts of the periscope tube, the optical system was changed as indicated in FIGURES 4 and 5 in the following way:

In order to obtain the required intermediate image two extra lenses were inserted in the periscope tube, one 14, above the point P, to form the required image, and a second 15 to restore the degree of convergence or divergence of the beam in the original periscope of FIG. 2. As the introduction of this extra image inverts the image, an extra lens was added in order to avoid the inversion of the observed image. In the present example this was done by adding the extra lens 18 in the top of the periscope which now comprises six lenses instead of five in the periscope as it was originally. When a new type is designed, the optical system can be designed so that "extra" lenses are not necessary.

The changes of the optical system, mentioned above, do not affect the ultimate position and dimensions of the exit light rays behind the eyepiece. No difficulties arose by the change of the optical system, and a good normal image quality was obtained. Furthermore it is obvious that the above-described method of compensation can be applied for any type and any make of submarine periscope, since one can make a choice between two possibilities:

(I) inserting an extra intermediate image at the point P;
(II) introducing a shift of an image-plane, already present in the periscope-optics, in such a way that this image-plane coincides with the point P. This can be done by changing the design of the optical system, in such a manner that, without increasing the number of lenses, an intermediate image is formed at P.

During a trial run at sea with the submarine "O–21" (NATO-submarine "S–801"), between 90 and 95 percent compensation was obtained. Later on, during other trial runs at sea, the residual error, due to some slight imperfections, was reduced and became almost completely negligible.

What we claim is:

In a periscope having a tube having a rigidly mounted lower section and an upper section, an optical system of lenses of which an upper part is located in the upper section of the periscope and a lower part is located in the lower section and an image at an eye piece at the end of the lower section, said periscope vibrating on application of substantially lateral stress to said upper section and when vibrating having separate optical axes for the lower lens section and for the upper lens section, said vibrating causing an oscillation of the image at said eye piece, said separate optical axes intersecting at a point intermediate between said lower lens section and said upper lens section, a lens means in said upper section to form an intermediary image at a point approximately at the point of intersection of said optical axes whereby said oscillation of the image at said eye piece of said vibrating periscope is substantially stopped.

References Cited

UNITED STATES PATENTS

| 829,121 | 8/1906 | Neumayer et al. | 88—72 |
| 1,445,284 | 2/1923 | Bell et al. | 88—72 |
| 2,414,608 | 1/1947 | Pontius | 88—72 |
| 2,564,704 | 8/1951 | Martling | 88—1 |

FOREIGN PATENTS

| 146,413 | 9/1921 | Great Britain. |

BENJAMIN A. BORCHELT, *Primary Examiner.*

SAMUEL FEINBERG, SAMUEL BOYD, *Examiners.*

G. L. PETERSON, G. H. GLANZMAN,
*Assistant Examiners.*